(12) United States Patent
Hayano et al.

(10) Patent No.: US 9,179,032 B2
(45) Date of Patent: Nov. 3, 2015

(54) INFORMATION PROCESSING APPARATUS, INFORMATION PROCESSING SYSTEM, AND INFORMATION PROCESSING METHOD

(71) Applicants: Hideaki Hayano, Kanagawa (JP); Daiya Miyasaka, Chiba (JP)

(72) Inventors: Hideaki Hayano, Kanagawa (JP); Daiya Miyasaka, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/448,751

(22) Filed: Jul. 31, 2014

(65) Prior Publication Data

US 2015/0043043 A1    Feb. 12, 2015

(30) Foreign Application Priority Data

Aug. 8, 2013 (JP) .................................. 2013-165298

(51) Int. Cl.
*H04N 1/04* (2006.01)
*H04N 1/23* (2006.01)
*H04N 1/21* (2006.01)
*H04N 1/56* (2006.01)

(52) U.S. Cl.
CPC .............. *H04N 1/2376* (2013.01); *H04N 1/21* (2013.01); *H04N 1/56* (2013.01); *H04N 2201/0081* (2013.01)

(58) Field of Classification Search
CPC ......... H04N 1/2376; H04N 1/21; H04N 1/56; H04N 2201/0081
USPC ......................... 358/505, 474, 498, 497, 540
See application file for complete search history.

(56) References Cited

U.S. PATENT DOCUMENTS

2006/0097062 A1*  5/2006  Cheong et al. ................. 235/494

FOREIGN PATENT DOCUMENTS

| JP | 2007-179372 | 7/2007 |
| JP | 2009-200953 | 9/2009 |

* cited by examiner

*Primary Examiner* — Houshang Safaipour
(74) *Attorney, Agent, or Firm* — Harness, Dickey & Pierce (57) ABSTRACT

An information processing apparatus includes an acquisition unit that acquires a reading condition on a document; a first generation unit that reads, in accordance with the acquired reading condition, the document including a first area in which information-holding images containing readable information and each having a different color overlap each other, and generates image data; a second generation unit that reads data contained in the generated image data and corresponding to the first area, and generates the information-holding images having the respective different colors from values of color components contained in each pixel of the read data; and an execution unit that reads the information contained in each of the generated information-holding images, and executes processing based on the read information.

12 Claims, 6 Drawing Sheets

INFORMATION PROCESSING APPARATUS, INFORMATION PROCESSING SYSTEM, AND INFORMATION PROCESSING METHOD

CROSS-REFERENCE TO RELATED APPLICATION

The present application claims priority to and incorporates by reference the entire contents of Japanese Patent Application No. 2013-165298 filed in Japan on Aug. 8, 2013.

BACKGROUND OF THE INVENTION

1. Field of the Invention

The present invention relates to an information processing apparatus, an information processing system, and an information processing method.

2. Description of the Related Art

Scanners are known that have a function of executing processing on scanned image data in accordance with a workflow including a plurality of processes in order. Examples of the processing in accordance with a workflow include processing of reading code information embedded in a barcode contained in scanned image data to change the following processing.

In general, there is a demand for increasing the volume of information embedded in a barcode in managing information by using barcodes. Such a demand also arises in a case of implementing a workflow in which code information embedded in a barcode is read to change the following processing. However, when the number of barcodes increases, the areas of the barcodes in image data become so large that only a small area is left for information other than the barcodes.

Technologies have recently been developed that can increase the volume of information without increasing areas of barcodes relative to image data by overlapping barcodes each having a different color, and can improve the recognition rate in reading code information embedded in the barcodes. Conventional technologies are described in Japanese Patent Application Laid-open No. 2007-179372 and Japanese Patent Application Laid-open No. 2009-200953, for example.

The conventional technologies described above, however, have a problem of degradation of the recognition rate in reading code information in some cases. When, for example, barcodes overlap each other that include at least one barcode having a color other than black, and the barcodes are scanned in black and white, the recognition rate lowers in reading code information embedded in the barcode not in black. In addition, when barcodes including a black barcode and barcodes not in black are scanned in black and white, a barcode having a color close to black overlaps the black barcode, which makes it difficult to accurately read code information embedded in the black barcode, thereby lowering the recognition rate. Such problems occur not only when a scanner reads a document and code information described on the document but also when, for example, a camera reads a document and code information by capturing an image thereof.

Therefore, there is a need to provide an information processing apparatus, an information processing system, and an information processing method that can prevent degradation of the recognition rate in reading code information.

SUMMARY OF THE INVENTION

It is an object of the present invention to at least partially solve the problems in the conventional technology.

According to an embodiment, there is provided an information processing apparatus that includes an acquisition unit that acquires a reading condition on a document; a first generation unit that reads, in accordance with the acquired reading condition, the document including a first area in which information-holding images containing readable information and each having a different color overlap each other, and generates image data; a second generation unit that reads data contained in the generated image data and corresponding to the first area, and generates the information-holding images having the respective different colors from values of color components contained in each pixel of the read data; and an execution unit that reads the information contained in each of the generated information-holding images, and executes processing based on the read information.

According to another embodiment, there is provided an information processing system that includes at least one information processing apparatus. The information processing system includes an acquisition unit that acquires a reading condition on a document; a first generation unit that reads, in accordance with the acquired reading condition, the document including a first area in which information-holding images containing readable information and each having a different color overlap each other, and generates image data; a second generation unit that reads data contained in the generated image data and corresponding to the first area, and generates the information-holding images having the respective different colors from values of color components contained in each pixel of the read data; and an execution unit that reads the information contained in each of the generated information-holding images, and executes processing based on the read information.

According to still another embodiment, there is provided an information processing method that includes acquiring a reading condition on a document; reading, in accordance with the acquired reading condition, the document including a first area in which information-holding images containing readable information and each having a different color overlap each other, to generate image data; reading data contained in the generated image data and corresponding to the first area to generate the information-holding images having the respective different colors from values of color components contained in each pixel of the read data; reading the information contained in each of the generated information-holding images; and executing processing based on the read information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments of an information processing apparatus, an information processing program, a storage medium, an information processing system, and an information processing method according to the present invention with reference to the accompanying drawings. The embodiments described below do not intend to limit the scope of the present invention.

First Embodiment

System Configuration

Figure 1:
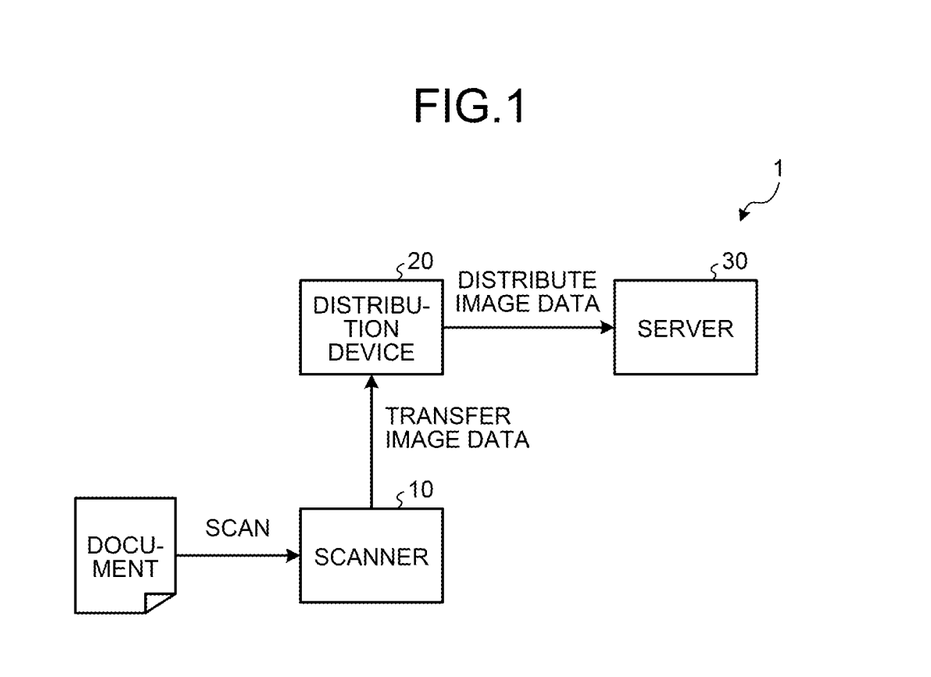
FIG. 1 is a diagram illustrating a configuration example of an information processing system according to a first embodiment of the present invention.

Described is the configuration of an information processing system according to a first embodiment with reference to FIG. 1. FIG. 1 is a diagram illustrating a configuration example of the information processing system according to the first embodiment.

As illustrated in FIG. 1, an information processing system 1 includes a scanner 10, a distribution device 20, and a server 30. These devices are connected to a network such as a local area network (LAN) or the Internet.

In the configuration described above, the scanner 10 scans a document according to a scanning condition and generates image data. The scanner 10 transfers the generated image data to the distribution device 20. The document includes an area in which information-holding images each having a different color and holding machine-readable information overlap each other. Examples of the information-holding images include images of two-dimensional codes such as QR codes (registered trademark). The colors of the two-dimensional codes to overlap are, for example, the three primary colors, that is, red, green and blue. In the following description, an area in which two-dimensional codes overlap each other may be referred to as an "overlapping area". The image data may be generated not only by scanning by the scanner but by image-capturing by a camera. Thus, a scanning condition in performing scanning and an image-capturing condition in performing image-capturing are examples of a reading condition in generating image data from a paper document or an electronic document (such as electronic paper).

A scanning condition for scanning a document including an overlapping area in which two-dimensional codes overlap each other specifies that the overlapping area be scanned in color or in black and white, and a non-overlapping area that does not include the overlapping area be scanned in color or in black and white. When two-dimensional codes having the three primary colors overlap each other in the overlapping area, a scanning condition is set that specifies that the overlapping area be scanned in color. The number of documents to be scanned may be one or larger than one. The scanner 10 may be a multifunction peripheral (MFP) having two or more functions from a scanner function, a printer function, a copier function, and a facsimile function and having at least the scanner function. The non-overlapping area is an example of a document area.

The distribution device 20 reads data contained in the image data generated by the scanner 10 and corresponding to the overlapping area, and generates a red two-dimensional code, a green two-dimensional code, and a blue two-dimensional code from values of color components contained in each pixel of the read data. The distribution device 20 then reads code information held by each of the generated two-dimensional codes, and performs processing on the basis of the read code information. The processing performed by the distribution device 20 may be any processing. For example, the processing may be performed in accordance with a workflow including a plurality of processes in order.

The first embodiment describes a case of performing a workflow in which scanned image data is distributed, as an example. In other words, code information held by two-dimensional codes according to the first embodiment relates to where to distribute the image data. With reference to the code information, the distribution device 20 distributes the image data to the server 30, which is the destination of the image data. The server 30 stores therein image data. Details of the processing performed by the scanner 10 and the distribution device 20 will be described later.

Device Configuration According to First Embodiment

Figure 2:
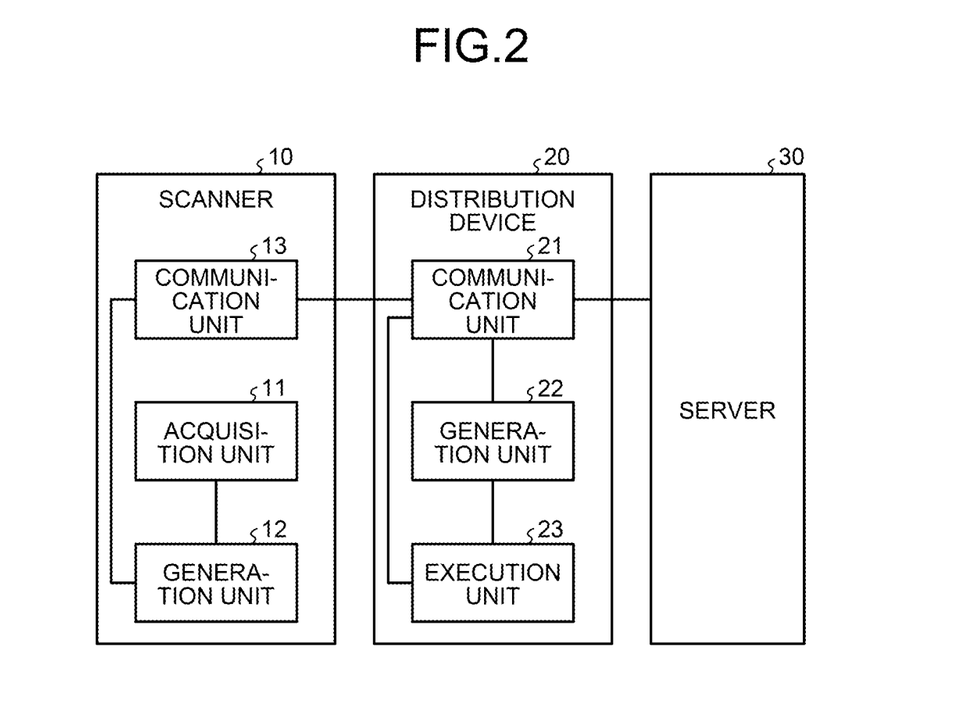
FIG. 2 is a functional block diagram illustrating configuration examples of a scanner and a distribution device according to the first embodiment.

Described next are configurations of the scanner 10 and the distribution device 20 according to the first embodiment with reference to FIG. 2. FIG. 2 is a functional block diagram illustrating configuration examples of the scanner 10 and the distribution device 20 according to the first embodiment.

As illustrated in FIG. 2, the scanner 10 includes an acquisition unit 11, a generation unit 12, and a communication unit 13. A part or all of the units above may be implemented by software (computer program) or a hardware circuit.

The acquisition unit 11 acquires a scanning condition on a document that is a scanning target. Specifically, the acquisition unit 11 acquires a scanning condition input by a user's operation through an operating display unit installed on the scanner 10. The operating display unit is, for example, a touch panel. The scanning condition may be input by a user's operation by using a display unit and an input unit installed on the scanner 10. The display unit is a monitor, and the input unit is operating buttons, for example. The scanning condition may be input from an external device such as a mobile terminal device or a personal computer (PC).

Figure 3A:
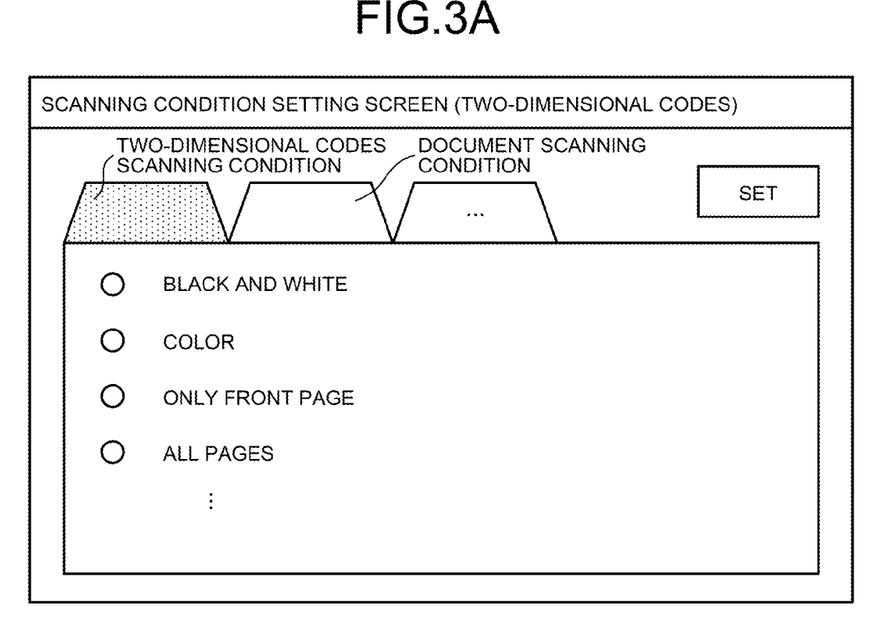
FIG. 3A is a diagram illustrating an example of a setting screen for setting a scanning condition on two-dimensional codes.
Figure 3B:
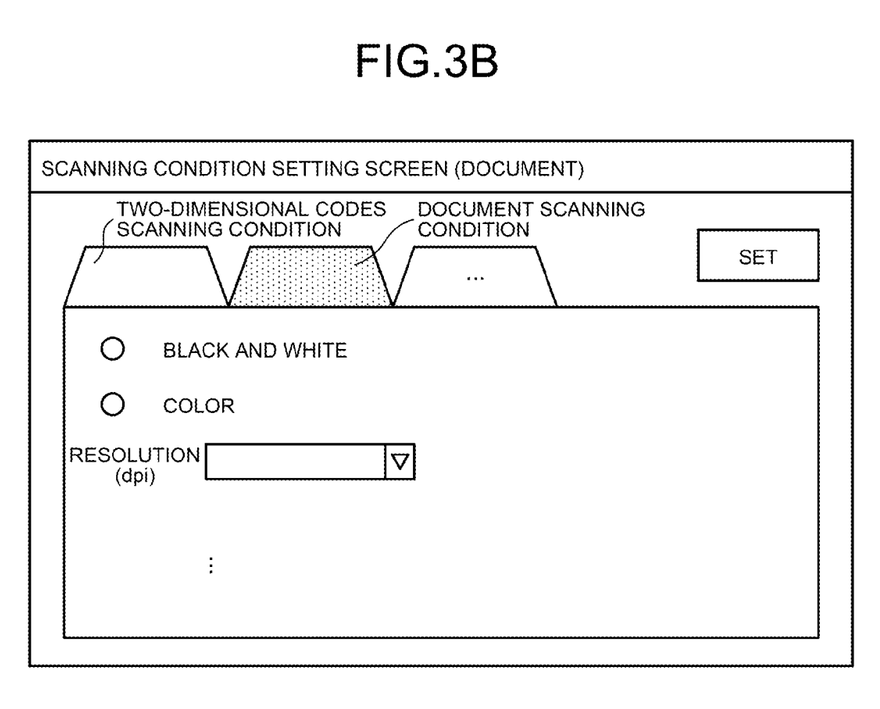
FIG. 3B is a diagram illustrating an example of a setting screen for setting a scanning condition on a document.

Described here are setting screens for setting a scanning condition with reference to FIGS. 3A and 3B. FIG. 3A is a diagram illustrating an example of a setting screen for setting a scanning condition on two-dimensional codes. FIG. 3B is a diagram illustrating an example of a setting screen for setting a scanning condition on a document.

As illustrated in FIG. 3A, a setting screen for setting a scanning condition on two-dimensional codes includes setting items such as "black and white", "color", "only front page", and "all pages". The setting item "black and white" indicates that the two-dimensional codes are scanned in black and white. The setting item "color" indicates that the two-dimensional codes are scanned in color. The setting item "only front page" indicates that only the two-dimensional codes included in the front page (first page) of the document are scanned in black and white or in color. The setting item "all pages" indicates that all the two-dimensional codes included in the entire document are scanned in black and white or in color. A user selects either one of the setting items "black and white" and "color", and selects either one of the setting items "only front page" and "all pages". The scanning condition on two-dimensional codes is, specifically, a scanning condition on an overlapping area.

As illustrated in FIG. 3B, the setting screen for setting a scanning condition on a document includes setting items such as "black and white", "color", and "resolution (dpi)". The setting item "black and white" indicates that the document is scanned in black and white. The setting item "color" indicates that the document is scanned in color. The setting item "resolution (dpi)" indicates the resolution applied to a scanning operation. The user selects either one of the setting items "black and white" and "color", and sets a value of "resolution (dpi)". The scanning condition on a document is, specifically, a scanning condition on the non-overlapping area.

The user selects setting items on the setting screens for setting a scanning condition illustrated in FIGS. 3A and 3B, and pushes a "set" button. This causes the acquisition unit 11 to acquire the scanning condition selected and set on the setting screens. The acquisition unit 11 then outputs the acquired scanning condition to the generation unit 12. Although, the setting screen for setting a scanning condition on two-dimensional codes and that on a document are displayed on separate screens in the example described above, these setting screens may be displayed on the same screen.

The description returns to FIG. 2. The generation unit 12 scans the document in accordance with the scanning condition acquired by the acquisition unit 11, and generates image data. The generation unit 12 is an example of a first generation unit. Specifically, the generation unit 12 receives the scanning condition output the acquisition unit 11. As described above, the scanning condition specifies, as an aspect, whether the overlapping area be scanned in color or in black and white, and the non-overlapping area be scanned in color or in black and white. In other words, there are four patterns of scanning conditions on the overlapping area and the non-overlapping area: A first pattern is a scanning condition of scanning the overlapping area in color and the non-overlapping area in color. A second pattern is a scanning condition of scanning the overlapping area in color and the non-overlapping area in black and white. A third pattern is a scanning condition of scanning the overlapping area in black and white and the non-overlapping area in color. A fourth pattern is a scanning condition of scanning the overlapping area in black and white and the non-overlapping area in black and white.

In the case of the first pattern, the generation unit 12 scans the entire document in color to generate image data. In the case of the second pattern, the generation unit 12 scans the entire document in color and converts the non-overlapping area, which has been set to be scanned in black and white, into black and white to generate image data. In the case of the third pattern, the generation unit 12 scans the entire document in color, and converts the overlapping area, which has been set to be scanned in black and white, into black and white to generate image data. In the case of the fourth pattern, the generation unit 12 scans the entire document in black and white to generate image data. The value of the resolution set as a setting item of the scanning condition is applied to the scanning operation.

When the scanning condition, such as the second pattern or the third pattern, specifies that the overlapping area be scanned in color and the non-overlapping area be scanned in black and white or vice versa, the entire document is scanned in color, and an area set to be scanned in black and white is converted into black and white. In the processing of converting an area into black and white, for example, the area may be divided into white and not white, and all the color components of not white may be converted into black. This reduces loads of scanning processing because a single scanning operation is sufficient under any scanning condition. The generation unit 12 transfers the generated image data to the distribution device 20 via the communication unit 13. The communication unit 13 controls communication with the distribution device 20.

The distribution device 20 includes a communication unit 21, a generation unit 22 and an execution unit 23. A part or all of the units above may be implemented by software (computer program) or a hardware circuit.

Figure 4:
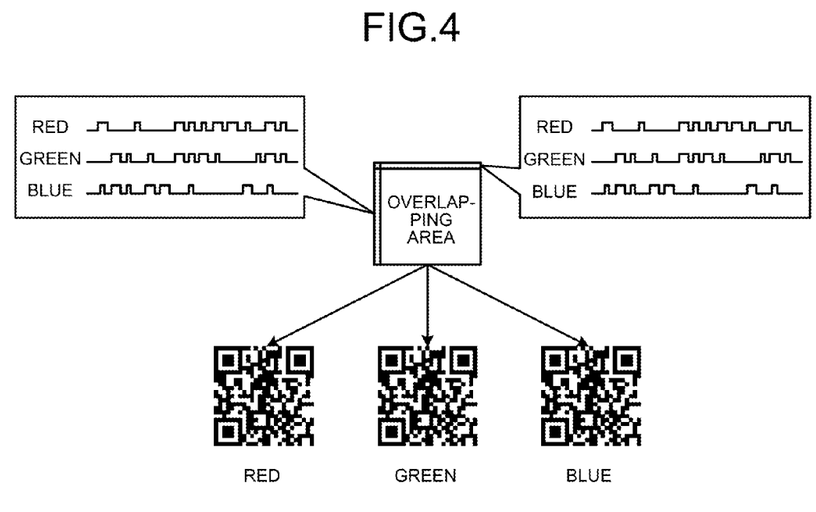
FIG. 4 is a diagram illustrating an example of how the two-dimensional codes are generated.

The communication unit 21 controls communication with the scanner 10 and the server 30. The generation unit 22 reads data contained in the image data and corresponding to the overlapping area, and generates two-dimensional codes each having a different color from values of color components contained in each pixel of the read data. The generation unit 22 is an example of a second generation unit. Described now is how to generate two-dimensional codes with reference to FIG. 4. FIG. 4 is a diagram illustrating an example of how the two-dimensional codes are generated.

The generation unit 22 receives the image data transferred by the scanner 10 via the communication unit 21. Assume that the overlapping area in the image data has been scanned in color and the overlapping area includes two-dimensional codes of red, green, and blue that overlap each other. As illustrated in FIG. 4, the generation unit 22 reads data contained in the image data and corresponding to the overlapping area from directions different from each other to extract values of red, green, and blue components contained in each pixel of the read data. The directions from which data is read are, for example, the horizontal direction and the vertical direction of the overlapping area. The generation unit 22 generates images of the two-dimensional codes of red, green, and blue separated from each other from the extracted values of red, green, and blue components. The generation unit 22 then outputs the image data received from the scanner 10 and the generated images of the two-dimensional codes to the execution unit 23.

The execution unit 23 reads information held by each of the images of the two-dimensional codes generated by the generation unit 22, and executes processing on the basis of the read information. Specifically, the execution unit 23 receives the image data and the images of the two-dimensional codes of red, green, and blue generated by the generation unit 22. The execution unit 23 reads code information held by the images of the two-dimensional codes of red, green, and blue to determine where to distribute the image data. Assume that the destination of the image data is the server 30. The information used to determine the destination of the image data is, for example, address information of a device to which the image data is distributed. The execution unit 23 distributes the image data to the server 30 via the communication unit 21.

The distribution device 20 stores therein plug-ins for implementing a workflow including a plurality of processes in order. Examples of the plug-ins include a plug-in for reading code information of colored two-dimensional codes and a plug-in for reading code information of black-and-white two-dimensional codes. The examples also include a plug-in for distributing image data. The execution unit 23 uses the plug-ins to control processing to implement the workflow.

Entire Processing of First Embodiment

Figure 5:
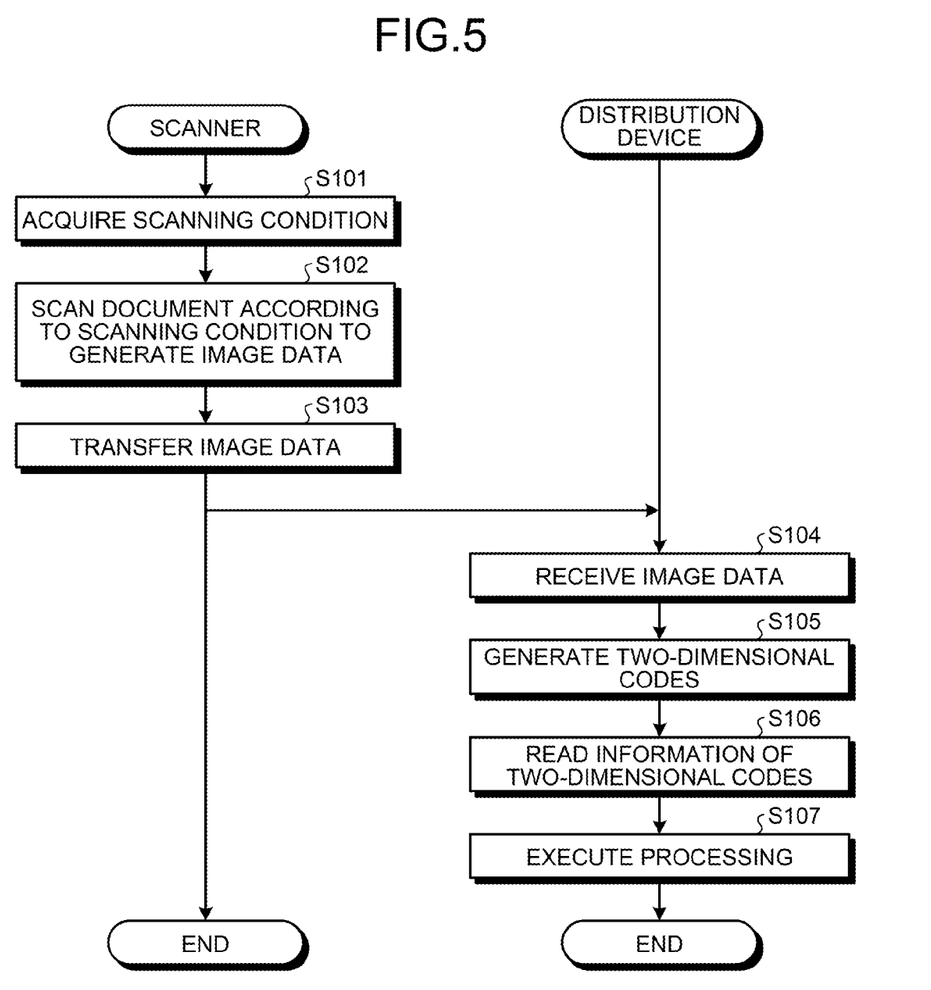
FIG. 5 is a sequence diagram illustrating an example of the entire procedure performed by the scanner and the distribution device according to the first embodiment.

Described next is the entire procedure of the first embodiment with reference to FIG. 5. FIG. 5 is a sequence diagram illustrating an example of the entire procedure performed by the scanner 10 and the distribution device 20 according to the first embodiment.

As illustrated in FIG. 5, the scanner 10 acquires a scanning condition input by a user's operation through the operating display unit installed on the scanner 10 (Step S101). The scanner 10 scans a document that is a scanning target in accordance with the acquired scanning condition to generate image data of the document (Step S102). The scanner 10 transfers the generated image data to the distribution device 20 (Step S103).

The distribution device 20 receives the image data transferred by the scanner 10 (Step S104). The distribution device 20 reads data contained in the image data and corresponding to an overlapping area from the horizontal direction and the vertical direction to generate images of red, green, and blue two-dimensional codes separated from each other from values of red, green, and blue components contained in each pixel of the read data (Step S105). The distribution device 20 then reads code information held by each of the generated images of the two-dimensional codes to determine where to distribute the image data (Step S106). The distribution device 20 executes processing for distributing the image data to the determined destination (Step S107).

Scanning Procedure of First Embodiment

Figure 6:
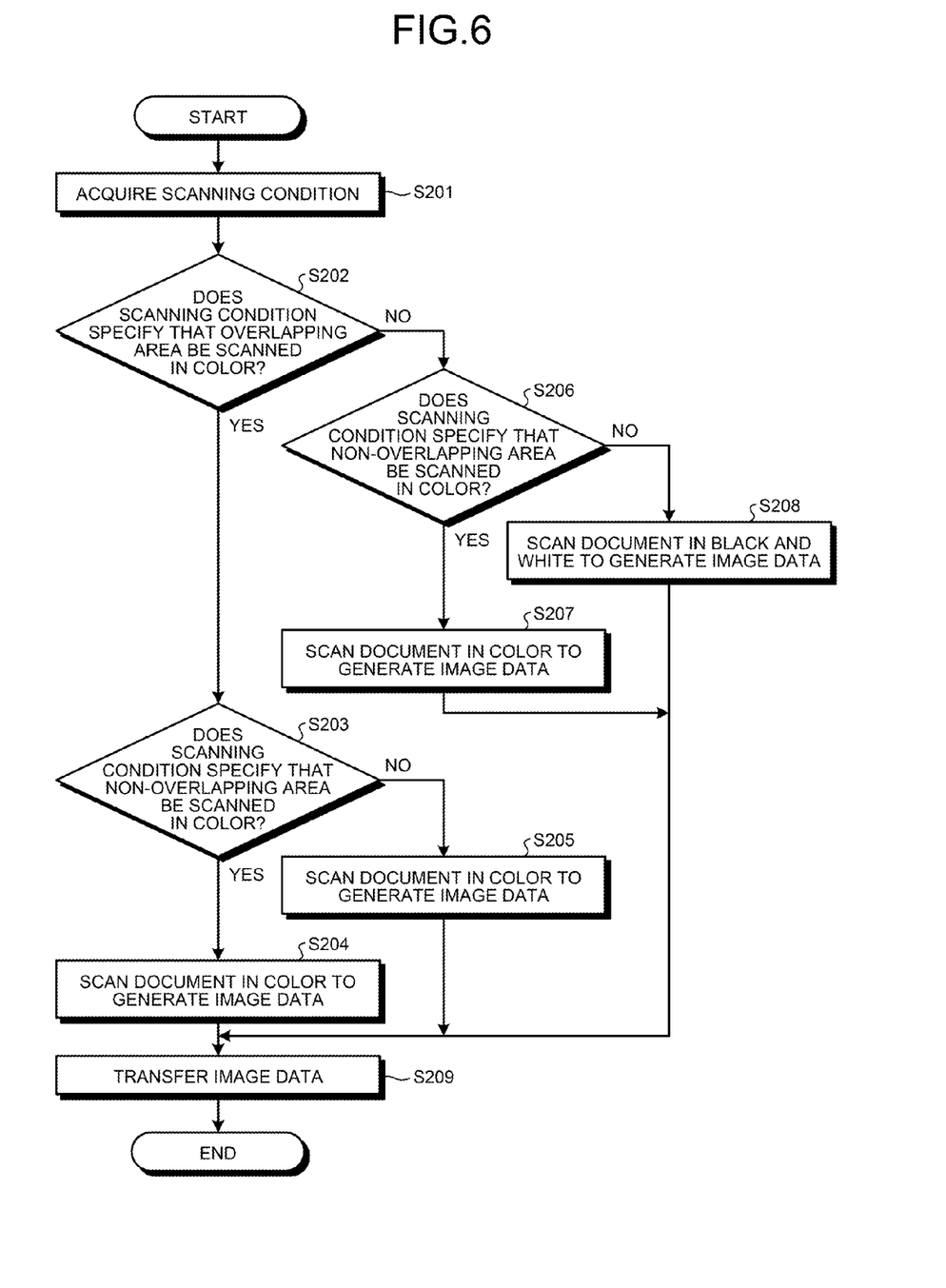
FIG. 6 is a flowchart illustrating an example of the scanning procedure according to the first embodiment.

Described next is the scanning procedure of the first embodiment with reference to FIG. 6. FIG. 6 is a flowchart illustrating an example of the scanning procedure according to the first embodiment. The scanning procedure mainly indicates the processing performed by the scanner 10.

As illustrated in FIG. 6, the acquisition unit 11 acquires a scanning condition specifying that the overlapping area be scanned in color or in black and white, and the non-overlapping area be scanned in color or in black and white (Step S201). The generation unit 12 determines whether the overlapping area be scanned in color according to the scanning condition acquired by the acquisition unit 11 (Step S202). If the generation unit 12 determines that the overlapping area be scanned in color according to the scanning condition (Yes at Step S202), the generation unit 12 determines whether the non-overlapping area be scanned in color according to the scanning condition (Step S203).

If the generation unit 12 determines that the non-overlapping area be scanned in color according to the scanning condition (Yes at Step S203), the generation unit 12 scans the entire document that is a scanning target in color to generate image data of the document (Step S204). In other words, the generation unit 12 scans the entire document in color when the scanning condition specifies that both the overlapping area and the non-overlapping area be scanned in color.

If the generation unit 12 determines that the non-overlapping area be scanned in black and white according to the scanning condition (No at Step S203), the generation unit 12 scans the entire document that is a scanning target in color and converts the non-overlapping area into black and white to generate image data (Step S205). In other words, when the scanning condition specifies that the overlapping area be scanned in color and the non-overlapping area be scanned in black and white, the generation unit 12 scans the entire document in color and converts the non-overlapping area, which is a scanning target in black and white, into black and white to generate image data.

If the generation unit 12 determines that the overlapping area be scanned in black and white according to the scanning condition (No at Step S202), the generation unit 12 determines whether the non-overlapping area be scanned in color (Step S206).

If the generation unit 12 determines that the non-overlapping area be scanned in color (Yes at Step S206), the generation unit 12 scans the entire document that is a scanning target in color and converts the overlapping area into black and white to generate image data (Step S207). In other words, when the scanning condition specifies that the overlapping area be scanned in black and white and the non-overlapping area be scanned in color, the generation unit 12 scans the entire document in color and converts the overlapping area, which is a scanning target in black and white, into black and white to generate image data.

If the generation unit 12 determines that the non-overlapping area be scanned in black and white according to the scanning condition (No at Step S206), the generation unit 12 scans the entire document that is a scanning target in black and white to generate image data of the document (Step S208). In other words, when the scanning condition specifies that both the overlapping area and the non-overlapping area be scanned in black and white, the generation unit 12 scans the entire document in black and white. The generation unit 12 then transfers the generated image data to the distribution device 20 via the communication unit 13 (Step S209).

Distribution Procedure of First Embodiment

Figure 7:
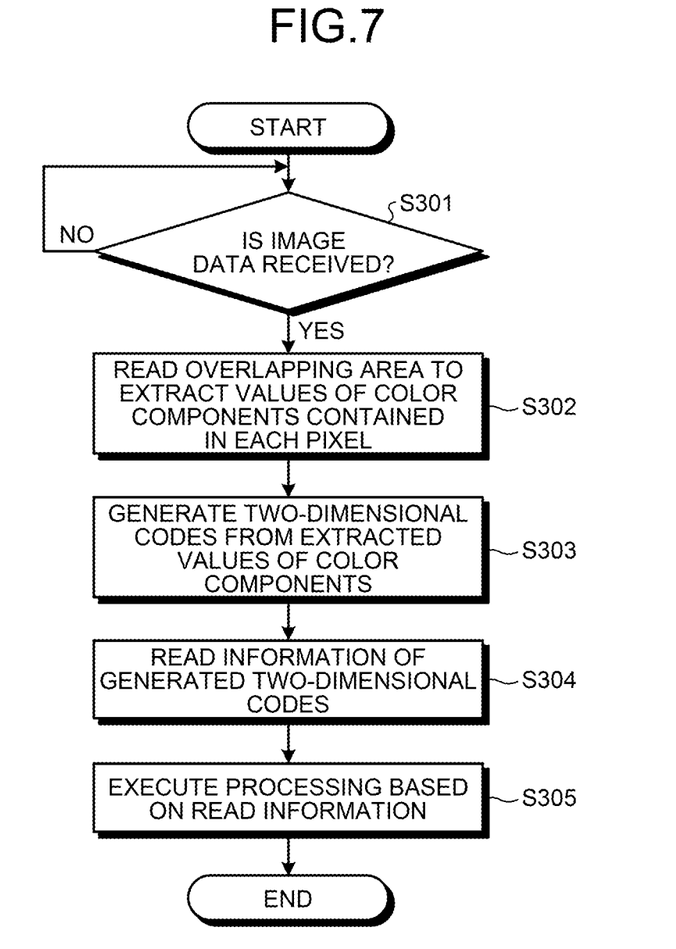
FIG. 7 is a flowchart illustrating an example of the distribution procedure according to the first embodiment.

Described next is the distribution procedure of the first embodiment with reference to FIG. 7. FIG. 7 is a flowchart illustrating an example of the distribution procedure according to the first embodiment. The distribution procedure mainly indicates the processing performed by the distribution device 20.

As illustrated in FIG. 7, if the generation unit 22 receives the image data from the scanner 10 via the communication unit 21 (Yes at Step S301), the generation unit 22 reads data contained in the received image data and corresponding to the overlapping area from the horizontal direction and the vertical direction, and extracts values of red, green, and blue components contained in each pixel of the read data (Step S302). If the generation unit 22 does not receive the image data (No at Step S301), the generation unit 22 is kept waiting for the image data.

The generation unit 22 generates images of red, green, and blue two-dimensional codes separated from each other from the extracted values of red, green, and blue components (Step S303). The execution unit 23 reads code information held by each of the images of the red, green, and blue two-dimensional codes generated by the generation unit 22, and determines where to distribute the image data (Step S304). The execution unit 23 distributes the image data to the determined destination via the communication unit 21 (Step S305).

Advantageous Effects of First Embodiment

The information processing system 1 scans a document including an overlapping area in which two-dimensional codes each having a different color overlap each other in accordance with a scanning condition specifying that the overlapping area and a non-overlapping area be scanned in color or in black and white to generate image data. The information processing system 1 reads data contained in the generated image data and corresponding to the overlapping area from the horizontal direction and the vertical direction, and generates the two-dimensional codes of different colors from values of color components contained in each pixel of the read data. The information processing system 1 reads code information of each of the generated two-dimensional codes, determines where to distribute the image data, and transmits the image data to the determined destination. The information processing system 1 can thus prevent the recognition rate from lowering in reading code information. In other words, the information processing system 1 scans a document including an overlapping area in which two-dimensional codes of the three primary colors overlap each other, in accordance with a scanning condition specifying that the document be scanned in color to generate image data, separates the overlapping two-dimensional codes into two-dimensional codes of respective colors and reads code information. The information processing system 1 can thus prevent the recognition rate from lowering in reading code information.

The information processing system 1 reads data corresponding to the overlapping area in which two-dimensional codes each having a different color overlap each other and generates the two-dimensional codes of different colors. This can satisfy the demand for increasing the volume of information embedded in a limited area.

Second Embodiment

Although the first embodiment of the information processing system 1 according to the present invention has been described, the present invention may be implemented in various forms besides the first embodiment described above. The following describes an embodiment different from the first embodiment in (1) colors of two-dimensional codes, (2) orientations of two-dimensional codes, (3) configuration, and (4) computer program.

(1) Colors of Two-Dimensional Codes

The first embodiment describes a case in which the colors of two-dimensional codes are red, green, and blue. The colors of two-dimensional codes are not limited to these colors, but may be any colors. Specifically, when two-dimensional codes each having a different color overlap each other and each color of the two-dimensional codes to be reproduced is known, the two-dimensional codes can be separated into two-dimensional codes of respective colors from components of the colors to be reproduced. Thus, any combination of colors can be used. The number of two-dimensional codes is not limited to three, but may be two or larger than three. When the number of two-dimensional codes is smaller or larger than three, the processing described in the first embodiment can be implemented as long as the colors of overlapping two-dimensional codes to be reproduced are known.

(2) Orientations of Two-Dimensional Codes

The orientations of two-dimensional codes overlapping each other may be any orientation. Specifically, the orientations of two-dimensional codes can be recognized on the basis of patterns for position detection contained in the two-dimensional codes. Thus, any orientation of two-dimensional codes is applicable.

(3) Configuration

Information including, for example, processing procedures, control procedures, specific names, and various types of data and parameters described above or illustrated in the accompanying drawings may optionally be changed unless otherwise specially mentioned. The constituent elements of the devices illustrated in the accompanying drawings are functional concepts and are not necessarily physically configured as illustrated. In other words, the specific state of distribution and integration of units is not limited to be as illustrated, and all or a part of the units can be functionally or physically distributed or integrated in any desirable unit according to various conditions of load or use. For example, the execution unit 23 may be separated into "a decoding unit" that reads code information held by two-dimensional codes, and "an execution unit" that executes processing on the basis of the read code information.

With regard to the system configuration, the information processing system may include an information processing apparatus having the functions of the scanner 10 and the distribution device 20. For example, an MFP having a scanner function may have the functions of the acquisition unit 11, the generation unit 12, the generation unit 22, the execution unit 23, and the like illustrated in FIG. 2, and a communication function with which the MFP can communicate with the server 30. The functions of the acquisition unit 11, the generation unit 12, the generation unit 22, and the execution unit 23 may be implemented on a cloud computing service. In other words, these functions described above can be implemented by one or more information processing apparatuses connected to a network. Although the first embodiment describes a case in which two-dimensional codes overlap each other, one-dimensional codes may also be used in the first embodiment.

(4) Computer Program

The information processing program executed in the scanner 10 and the distribution device 20 is recorded and provided, as an aspect, in a computer-readable recording medium such as a compact disc read only memory (CD-ROM), a flexible disk (FD), a compact disc recordable (CD-R), and a digital versatile disc (DVD), as an installable or executable file. The information processing program may be stored in a computer connected to a network such as the Internet and provided by being downloaded via the network. Furthermore, the information processing program may be provided or distributed via a network such as the Internet. The information processing program may be embedded and provided in a ROM, for example.

The information processing program executed in the scanner 10 and the distribution device 20 is configured as a module including the units described above (the acquisition unit 11, the generation unit 12, the generation unit 22, and the execution unit 23). As an actual hardware configuration, a CPU (processor) reads the information processing program from the storage medium and executes it to load the above-described units on a main memory, and implements the acquisition unit 11, the generation unit 12, the generation unit 22, and the execution unit 23 on the main memory.

An aspect of the present invention provides an advantageous effect of preventing degradation of the recognition rate in reading code information.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
an acquisition unit that acquires a reading condition on a document;
a first generation unit that reads, in accordance with the acquired reading condition, the document including a first area in which information-holding images containing readable information and each having a different color overlap each other, and generates image data;
a second generation unit that reads data contained in the generated image data and corresponding to the first area, and generates the information-holding images having the respective different colors from values of color components contained in each pixel of the read data; and
an execution unit that reads the information contained in each of the generated information-holding images, and executes processing based on the read information, wherein:
the reading condition indicates that the first area including the information-holding images is to be read in color or in black and white, and a second area other than the first area in the document is to be read in color or in black and white, and
the first generation unit reads the document in color and converts the second area into black and white to generate the image data when the reading condition indicates that the first area is to be read in color and the second area is to be read in black and white, and
the first generation unit reads the document in color and converts the first area into black and white to generate the image data when the reading condition indicates that the first area is to be read in black and white and the second area is to be read in color.

2. The information processing apparatus according to claim 1, wherein the second generation unit reads the data corresponding to the first area in directions different from each other.

3. The information processing apparatus according to claim 1, wherein
the first generation unit reads the document including the first area in which the information-holding images each having a different color of red, green, or blue overlap each other; and
the second generation unit generates the information-holding images each having a color of red, green, or blue from values of the color components composed of red, green, and blue components.

4. The information processing apparatus according to claim 1, wherein
the information-holding images include two-dimensional codes; and
the second generation unit recognizes orientations of the two-dimensional codes from patterns for position detection included in the two-dimensional codes.

5. An information processing system including at least one information processing apparatus, the information processing system comprising:
an acquisition unit that acquires a reading condition on a document;
a first generation unit that reads, in accordance with the acquired reading condition, the document including a first area in which information-holding images containing readable information and each having a different color overlap each other, and generates image data;
a second generation unit that reads data contained in the generated image data and corresponding to the first area, and generates the information-holding images having the respective different colors from values of color components contained in each pixel of the read data; and
an execution unit that reads the information contained in each of the generated information-holding images, and executes processing based on the read information, wherein:
the reading condition indicates that the first area including the information-holding images is to be read in color or in black and white, and a second area other than the first area in the document is to be read in color or in black and white, and
the first generation unit reads the document in color and converts the second area into black and white to generate the image data when the reading condition indicates that the first area is to be read in color and the second area is to be read in black and white, and
the first generation unit reads the document in color and converts the first area into black and white to generate the image data when the reading condition indicates that the first area is to be read in black and white and the second area is to be read in color.

6. The information processing system according to claim 5, wherein the second generation unit reads the data corresponding to the first area in directions different from each other.

7. The information processing system according to claim 5, wherein
the first generation unit reads the document including the first area in which the information-holding images each having a different color of red, green, or blue overlap each other; and
the second generation unit generates the information-holding images each having a color of red, green, or blue from values of the color components composed of red, green, and blue components.

8. The information processing system according to claim 5, wherein
the information-holding images include two-dimensional codes; and
the second generation unit recognizes orientations of the two-dimensional codes from patterns for position detection included in the two-dimensional codes.

9. An information processing method comprising:
acquiring a reading condition on a document;
reading, in accordance with the acquired reading condition, the document including a first area in which information-holding images containing readable information and each having a different color overlap each other, to generate image data;
reading data contained in the generated image data and corresponding to the first area to generate the information-holding images having the respective different colors from values of color components contained in each pixel of the read data;
reading the information contained in each of the generated information-holding images; and
executing processing based on the read information, wherein:
the reading condition indicates that the first area including the information-holding images is to be read in color or in black and white, and a second area other than the first area in the document is to be read in color or in black and white, and the reading the document includes
- reading the document in color and converting the second area into black and white to generate the image data when the reading condition indicates that the first area is to be read in color and the second area is to be read in black and white, and
- reading the document in color and converting the first area into black and white to generate the image data when the reading condition indicates that the first area is to be read in black and white and the second area is to be read in color.

10. The information processing method according to claim 9, wherein the reading the data includes reading the data corresponding to the first area in directions different from each other.

11. The information processing method according to claim 9, wherein
- the reading the document includes reading the document including the first area in which the information-holding images each having a different color of red, green, or blue overlap each other; and
- the reading the data includes generating the information-holding images each having a color of red, green, or blue from values of the color components composed of red, green, and blue components.

12. The information processing method according to claim 9, wherein
- the information-holding images include two-dimensional codes; and
- the reading the data includes recognizing orientations of the two-dimensional codes from patterns for position detection included in the two-dimensional codes.

* * * * *